United States Patent

Lee et al.

[11] Patent Number: 5,412,936
[45] Date of Patent: May 9, 1995

[54] METHOD OF EFFECTING START-UP OF A COLD STEAM TURBINE SYSTEM IN A COMBINED CYCLE PLANT

[75] Inventors: Daniel T. Lee, Clifton Park; Leroy O. Tomlinson, Schenectady, both of N.Y.

[73] Assignee: General Electric Co., Schenectady, N.Y.

[21] Appl. No.: 997,966

[22] Filed: Dec. 30, 1992

[51] Int. Cl.⁶ .............................................. F02C 6/18
[52] U.S. Cl. ................. 60/39.02; 60/39.182; 60/646
[58] Field of Search ............. 60/39.02, 39.142, 39.182, 60/646, 656; 122/7 R

[56] References Cited

U.S. PATENT DOCUMENTS

| | | | |
|---|---|---|---|
| 3,358,450 | 12/1967 | Schroedter et al. | 60/646 |
| 4,282,708 | 8/1981 | Kuribayashi et al. | |
| 4,437,313 | 3/1984 | Taber et al. | |
| 4,519,207 | 5/1985 | Okabe et al. | |
| 4,561,254 | 12/1985 | Martens et al. | |
| 4,598,551 | 7/1986 | Dimitroff et al. | 60/646 |
| 5,029,443 | 7/1991 | Hauser. | |
| 5,042,246 | 8/1991 | Moore et al. | |
| 5,095,706 | 3/1992 | Saito et al. | 60/646 |

FOREIGN PATENT DOCUMENTS 93907  5/1984  Japan .................. 60/39.182

OTHER PUBLICATIONS

GE Turbine Reference Library–"GE Combined-Cycle Product Line and Performance", Dec. 1989 brochure.

*Primary Examiner*—Louis J. Casaregola
*Attorney, Agent, or Firm*—Nixon & Vanderhye

[57] ABSTRACT

In a combined cycle power generation system which includes a gas turbine; a steam turbine; and a heat recovery steam generator which includes a superheater section and an evaporator section, and wherein condensate from the steam turbine is reheated in the heat recovery steam generator by exhaust gas from the gas turbine and returned via a main steam outlet to the steam turbine, a method of effecting start-up of the steam turbine comprising the steps of:

a) dumping a portion of the gas turbine exhaust gas to atmosphere, while simultaneously introducing a remaining portion of the gas turbine exhaust gas to the heat recovery steam generator;

b) with the main steam outlet from the heat recovery steam generator closed, extracting steam from an intermediate location in the superheater and supplying the extracted steam to the steam turbine at a temperature between about 550–1000° F.; and, after the steam turbine is started and a warm-up cycle completed, c) terminating the extraction of steam from the intermediate location in the superheater and opening the main steam outlet from the heat recovery steam generator.

15 Claims, 1 Drawing Sheet

METHOD OF EFFECTING START-UP OF A COLD STEAM TURBINE SYSTEM IN A COMBINED CYCLE PLANT

TECHNICAL FIELD

This invention relates to combined cycle thermal energy and power systems and, specifically, to systems which combine gas turbines, steam turbines, heat recovery steam generators and associated controls for the production of electrical power.

BACKGROUND PRIOR ART

Currently available combined cycle systems of the assignee of this invention include single and multi-shaft configurations. Single shaft configurations may include one gas turbine, one steam turbine, one generator and one heat recovery steam generator (HRSG). The gas turbine and steam turbine are coupled to the single generator in a tandem arrangement on a single shaft. Multi-shaft systems, on the other hand, may have one or more gas turbine-generators and HRSG's that supply steam through a common steam header to a single steam turbine generator. In either case, steam is generated in one or more unfired HRSG's for delivery to the condensing steam turbine.

Conventional practice for reheat steam cycles utilizing reheat is generally to configure the steam system with one steam turbine to one HRSG. In a single gas turbine/steam turbine/HRSG system, condensate from the condenser is pumped directly to the HRSG where it is reheated by the gas turbine exhaust gases, and is thereafter returned to the steam turbine.

To start a cold steam turbine system in a combined cycle plant normally requires the gas turbine to be at a low load so that the steam to the steam turbine is at a low temperature compatible to the cold steam turbine metal. Failure to do so shortens the steam turbine life due to low cycle fatigue of parts, distorted casing and shaft, rubbed seals and blades, etc. However, running the gas turbine at low load not only reduces power generated from the gas turbine but also wastes fuel. Alternatively, where the gas turbine load is not reduced, the high temperature steam must be passed through an attemporating station to reduce the steam to the appropriate temperature.

SUMMARY OF THE INVENTION

The object of this invention is to allow starting of a cold steam turbine system with the gas turbine at any load, thereby permitting the power generated to be maintained at a constant and stable level, and to further allow the temperature differential of steam and metal to be minimized thereby enhancing the life of the steam turbine parts.

In accordance with the present invention, methods are disclosed for use where a gas turbine exhaust gas bypass damper is employed and, in a second embodiment, where a gas turbine exhaust gas bypass stamper is not employed. In either case, the methods in accordance with the present invention allow the start-up of a cold steam turbine plant with steam from a heat recovery steam generator (HRSG) connected to a fully loaded gas turbine. In other words, the method in accordance with this invention actually allows start-up of steam turbines at any temperature, with associated gas turbines and HRSG's at any load.

In accordance with a first exemplary embodiment, therefore, where a gas turbine exhaust gas bypass damper is employed, exhaust gas from the gas turbine is partially dumped to the atmosphere by means of the bypass damper. The remaining exhaust gas is supplied to the HRSG superheater and the HRSG evaporator, through other HRSG sections and is then discharged to atmosphere. At this time, the main superheater outlet line is closed by an isolation valve. Steam is extracted from an intermediate location of the superheater and combined with saturated steam from a steam drum, and then is supplied to an auxiliary start-up steam circuit. A temperature control valve controls outgoing steam temperature after mixing with the drum steam, and provides desirable superheat. A pressure control valve controls upstream pressure as required for proper drum moisture separator functions.

The isolation valve is subsequently opened to supply steam to the steam turbine header, from which point seal steam is supplied to the seal system at a temperature compatible with the steam turbine requirements. After the seals are established and the steam turbine condenser ready to accept steam, the steam turbine inlet valve is opened and steam at compatible temperatures is allowed into the steam turbine for warm-up. At the same time, excess steam is dumped to the condenser by means of a bypass line. When steam turbine warm-up is completed so that hot steam may be allowed to enter the steam turbine, the auxiliary start-up steam header isolation valve is closed and the damper is adjusted to allow additional exhaust gas to enter the HRSG to thereby increase steam production. Start up completed, the main isolation valve is then opened to fully load the steam turbine.

In a second exemplary embodiment of the invention, where no bypass damper is utilized to control gas turbine exhaust, the exhaust gas from the gas turbine is forwarded directly to the HRSG. The exhaust gas is supplied first to the HRSG superheater and evaporator and then to other HRSG sections before exiting to atmosphere. As in the previously described procedure, the main superheater outlet line is closed by an isolation valve, and steam extracted from an intermediate location in the superheater along with saturated steam from the steam drum is supplied to an auxiliary start-up steam circuit. Temperature and pressure control valves control outgoing steam temperature and pressure after mixing with the drum steam as in the first described embodiment.

The isolation valve is then opened to supply steam to the steam turbine header. If condenser vacuum is initially available, excess steam is dumped to the steam turbine condenser via a dump valve. If condenser vacuum initially is not established, then seal steam will be supplied from the steam header to the seal system at a temperature compatible with the steam turbine requirements. Excess steam will be vented to atmosphere or other sinks such as a dump condenser. After the seals are established and the steam condenser is ready to accept the steam, the steam turbine inlet valve is opened and steam at a compatible temperature is allowed into the steam turbine for warm-up. When the steam turbine warm-up is complete so that hot steam can be allowed into the steam turbine, the auxiliary start-up steam header isolation valve is closed, the main isolation valve opened, and the bypass valve closed. The steam turbine plant start-up is now completed.

Thus, in accordance with its broadest aspects, the invention relates to a combined cycle power generation system which includes a gas turbine; a steam turbine; and a heat recovery steam generator which includes a superheater section and an evaporator section, and wherein condensate from the steam turbine is reheated in the heat recovery steam generator by exhaust gas from the gas turbine and returned via a main steam outlet to the steam turbine, and more specifically to a method of effecting start-up of the steam turbine comprising the steps of:

a) passing gas turbine exhaust gas through the heat recovery steam generator;

b) extracting steam from the heat recovery steam generator from a location between the evaporator and superheater;

d) controlling the temperature of the extracted steam to minimize a temperature differential between the extracted steam and metal components of the steam turbine; and d) utilizing the extracted steam, at controlled temperature and pressure, to start up the steam turbine.

In another aspect, the invention provides in a combined cycle power generation system which includes a gas turbine; a steam turbine; and a heat recovery steam generator which includes a superheater section and an evaporator section, and wherein condensate from the steam turbine is reheated in the heat recovery steam generator by exhaust gas from the gas turbine and returned via a main steam outlet to the steam turbine, a method of effecting start-up of the steam turbine comprising the steps of:

a) dumping a portion of the gas turbine exhaust gas to atmosphere, while simultaneously introducing a remaining portion of the gas turbine exhaust gas to the heat recovery steam generator;

b) with the main steam outlet from the heat recovery steam generator closed, extracting steam from an intermediate location in the superheater and supplying the extracted steam to the steam turbine at a temperature below normal steam inlet temperature; and, after the steam turbine is started and a warm-up cycle completed, c) terminating the extraction of steam from the intermediate location in the superheater and opening the main steam outlet from the heat recovery steam generator.

In another aspect, the invention provides a combined cycle power generation system which includes a gas turbine; a steam turbine; and a heat recovery steam generator which includes a superheater section and an evaporator section, and wherein condensate from the steam turbine is reheated in the heat recovery steam generator by exhaust gas from the gas turbine and returned via a main steam outlet to the steam turbine, a method of effecting start-up of the steam turbine comprising the steps of:

a) introducing the gas turbine exhaust gas to the heat recovery steam generator;

b) with the main steam outlet from the heat recovery steam generator closed, extracting steam from an intermediate location in the superheater and supplying the extracted steam to the steam turbine at a temperature below normal steam inlet temperature;

c) terminating the extraction of steam from the intermediate location in the superheater and opening the main steam outlet from the heat recovery steam generator.

The following benefits and advantages are achieved as a result of the methods in accordance with the present invention as described above:

(1) The invention allows the start-up of a cold steam plant including a cold steam turbine without restricting the gas turbine to low load, and without external steam sources for steam seals and warm-up steam.

(2) The invention allows the start-up of a steam plant at any temperature with gas turbines at any load.

(3) The invention permits the supply of main steam from the HRSG at a temperature compatible to the steam turbine metal temperature in its full range.

(4) The invention permits the supply of seal steam from the HRSG to the steam turbine at a temperature compatible to the seal metal temperatures.

(5) The invention controls steam temperature by attemporating with saturated steam from the steam drum. This eliminates the hazardous condition of steam turbine water induction when a more conventional water attemporating scheme is employed.

(6) As a result of the present invention, steam attemporating is achieved in the vicinity of the steam drum and superheater. This feature allows the need of only a small amount of piping. The attendant needs and costs of installation, freeze protection, draining, etc. associated with long piping in the case of a traditional attemporator is much reduced.

(7) The present invention allows the main superheater lead to be isolated by valving, thereby allowing the deadheading of this section of the superheater, which permits pressure to build up in the auxiliary start-up steam circuit for flow and temperature control.

(8) In accordance with the invention, steam is extracted from an intermediate location of the superheater, rather than from the main outlet of the superheater where the steam can be too hot.

(9) In accordance with the invention, a temperature control valve (TCV) will control the auxiliary starting steam for desired temperature matching with the steam turbine.

(10) In accordance with the invention, a pressure control valve (PCV) will control the pressure in the steam drum and arrange suitable for the proper functioning of the drum moisture separators.

Additional objects and advantages of the present invention will become apparent from the detailed description which follows.

DISCLOSE OF THE BEST MODE FOR CARRYING OUT THE INVENTION

Figure 1:
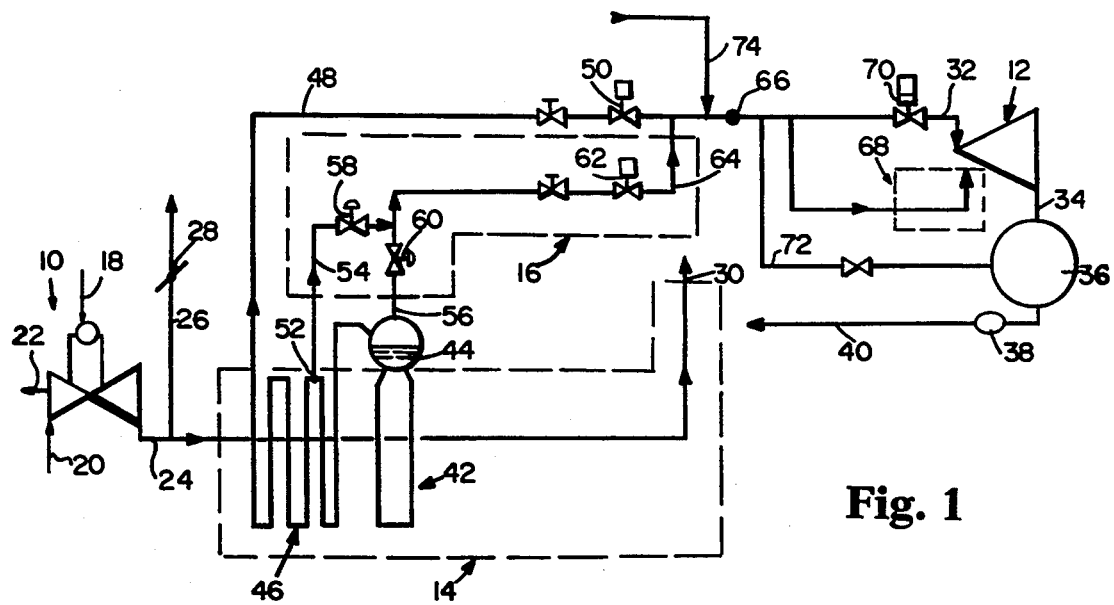
FIG. 1 illustrates an auxiliary HRSG start-up steam circuit diagram for a steam and gas turbine combined cycle arrangement in accordance with a first exemplary embodiment of the invention.

With reference to FIG. 1, a power generation cycle diagram for a combined cycle plant in accordance with a first exemplary embodiment of the invention generally includes a gas turbine 10, a steam turbine 12, and a heat recovery steam generator (HRSG) 14. An auxiliary start-up steam circuit is indicated in the diagram by numeral 16.

The gas turbine 10 receives fuel from an inlet 18 while air and gas are introduced via a line 20. The gas turbine, which would typically be connected to a generator 22, exhausts gas through a line 24. The exhaust gas is partially dumped to atmosphere by means of a line 26 controlled by a damper 28 while the remaining exhaust gas flows via line 24 into the HRSG 14. The exhaust gas heat is utilized to reheat steam for use in a steam turbine 12 as will be described further below. The cooled exhaust gas exits the HRSG to atmosphere at 30.

The steam turbine 12 receives steam via conduit 32 and exhausts the steam via line 34 to the steam condenser 36. Condensate from the condenser 36 then passes via condensate pump 38 and line 40 to the HRSG 14 where it is introduced into the HRSG evaporator 42 and specifically into a steam drum 44. The HRSG 14 also incorporates a superheater 46 which reheats the steam through heat exchange contact with the exhaust gas from the gas turbine 10 and returns heated steam to the steam turbine via conduit 48.

The arrangement described to this point is well known in the art.

In accordance with a first exemplary embodiment of this invention, the auxiliary start-up steam circuit 16 is utilized to allow the steam turbine 12 to be started in a cold condition with the gas turbine 10 running at any load. The specific arrangement of the auxiliary start-up circuit will be described below in conjunction with a preferred method of starting the steam turbine 12 in a cold condition.

As indicated hereinabove, exhaust gas from the gas turbine 10 will be forwarded to the HRSG 14 where it flows across the HRSG superheater 46, evaporator 42 and other HRSG sections (not shown, but which may include, for example, additional evaporators), exiting to atmosphere at 30. A portion of the exhaust gas is dumped to atmosphere via line 26, controlled by damper 28, upstream of the HRSG 14.

During start-up, the main superheater outlet line 48 is closed by an isolation valve 50. Steam is extracted, however, from an intermediate location (indicated at 52) of the superheater 46 by means of a line 54 (at a temperature of about 1000° F.) and supplied to the auxiliary start-up steam circuit 16. At the same time, saturated steam (at a temperature of about 550° F.) from the steam drum 44 is also supplied to the auxiliary start-up steam circuit 16 by means of line 56. A temperature control valve 58 is utilized to control outgoing steam temperature after mixing with the cooler drum steam, while a pressure control valve 60 controls upstream pressure as required for proper drum moisture separator functions. The steam supplied during start-up via the start-up circuit will normally be between 550–1000° F., depending on the turbine metal temperature. In other words, the valves 58 and 60 will be used to minimize the temperature differential between the steam and the turbine metal during start-up.

An isolation valve 62 within the auxiliary start-up steam circuit 16 is opened to supply superheated steam via line 64 to the steam turbine header 66. From the steam turbine header 66, a portion of the superheated steam is diverted to the steam turbine seal system 68 at the temperature compatible with the requirements of the steam turbine 12. After the seals are established, and steam condenser 36 is made ready to accept steam from the steam turbine 12 via line 34, the steam turbine inlet valve 70 is opened and superheated steam at a compatible temperature is allowed into the steam turbine 12 for warm-up. During the warm-up stage, excess steam is dumped to the condenser via the bypass line 72. After the steam turbine warm-up period is completed, and hot steam can be allowed into the steam turbine, the auxiliary start-up steam header isolation valve 62 is closed and damper 28 adjusted to permit additional exhaust gas into the HRSG 14 to increase HRSG steam production. The main isolation valve 50 is then opened to fully load the steam turbine.

The above described method thus permits start-up of the steam turbine 12 at any temperature with the gas turbine 10 and the HRSG 14 at any load thereby permitting generated power to be maintained at a constant and stable level while at the same time, allowing the temperature differential of the steam and metal parts of the otherwise cold steam turbine to be minimized thereby enhancing the life of the steam turbine parts.

Figure 2:
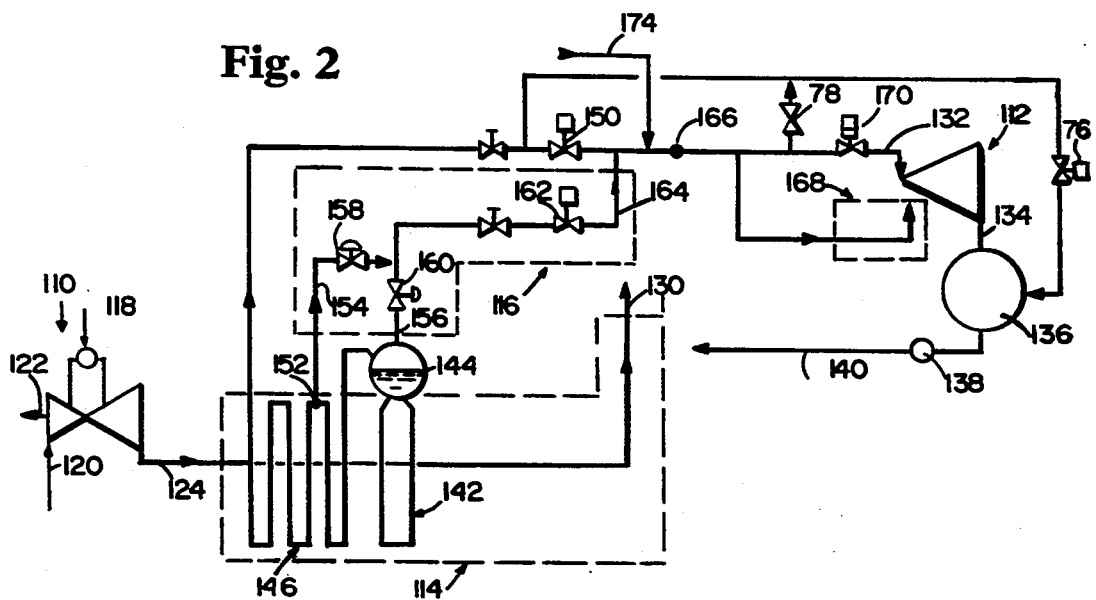
FIG. 2 illustrates an auxiliary HRSG start-up steam circuit diagram for a steam and gas turbine combined cycle arrangement in accordance with a second exemplary embodiment of the invention.

Turning to FIG. 2, a second exemplary embodiment of the invention is illustrated in diagrammatic form and, in this case, no gas turbine exhaust gas bypass damper is utilized. For convenience, components in common with components of the system illustrated in FIG. 1 are designated by the same reference numerals but with the prefix 1 added.

While the systems as described above makes reference only to a single gas turbine, HRSG and steam turbine arrangement, it will be appreciated that systems utilizing multiple gas turbines, steam turbines and HRSG's may incorporate the auxiliary start-up steam circuit of the present invention to equal advantage. Where multiple HRSG's are employed, for example, superheated steam may introduced upstream of the steam turbine header 66 via 74.

Thus, all of the exhaust gas from the gas turbine 110 will be forwarded to the HRSG 114. The exhaust gas flows across the superheater 146, evaporator 142 and other HRSG sections (not shown), and then exits to atmosphere via line 130.

During start-up, the main superheater outlet line 148 is closed by an isolation valve 150 and steam is extracted from an intermediate location (indicated at 152) of the superheater 146 by means of line 154 and supplied to the auxiliary start-up steam circuit 116. At the same time, saturated steam from the steam drum 144 is also supplied to the auxiliary start-up steam circuit 116 by means of line 156.

A temperature control valve 158 controls outgoing steam temperature after mixing with the drum steam, again with the objective of minimizing the temperature differential between the steam and the steam turbine parts. The pressure control valve 160 controls upstream pressure as required for proper drum moisture separator functions.

The isolation valve 162 is opened to supply steam to the steam turbine header 166. If condenser vacuum is initially available, excess steam is dumped to the condenser 136 by means of dump valve 76. If condenser vacuum is initially not established, then seal steam will be supplied from the steam header 166 to the seal system 168 at a temperature compatible with the steam turbine 112. Excess steam will be vented at point 78 to atmosphere or other sinks such as a dump condenser.

After the seals are established and condenser 136 is ready to accept steam, the steam turbine inlet valve 170 is opened and steam at a compatible temperature is allowed into the steam turbine 112 for warm-up. When steam turbine warm-up is completed, so that hot steam can be allowed into the steam turbine 112, the auxiliary start-up steam header isolation valve 162 is closed and the main isolation valve 150 opened. At the same time, the bypass valve 76 is closed. This completes the start-up procedure.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a combined cycle power generation system which includes a gas turbine; a steam turbine; and a heat recovery steam generator which includes a superheater section and an evaporator section, and wherein condensate from the steam turbine is reheated in the heat recovery steam generator by exhaust gas from the gas turbine and returned via a main steam outlet to the steam turbine, a method of effecting start-up of the steam turbine comprising the steps of:
   a) passing gas turbine exhaust gas through the heat recovery steam generator;
   b) extracting steam from an intermediate location in the superheater;
   c) controlling the temperature of the extracted steam to minimize a temperature differential between the extracted steam and metal components of the steam turbine; and
   d) utilizing the extracted steam, at controlled temperature and pressure, to start up the steam turbine.

2. The method of claim 1 wherein said extracted steam is at a temperature of between about 550–1000° F.

3. The method of claim 1 including the step of, simultaneously with step a), dumping a portion of the gas turbine exhaust gas to atmosphere, while simultaneously introducing a remaining portion of the gas turbine exhaust gas to the heat recovery steam generator.

4. The method of claim 1 wherein condensed steam is supplied to the heat recovery steam generator by a steam turbine condenser and wherein a portion of the steam extracted from the intermediate location in the superheater is supplied directly to the steam turbine condenser.

5. The process of claim 1 wherein condensed steam is supplied to the heat recovery steam generator by a steam turbine condenser and wherein a portion of the steam extracted from the intermediate location in the superheater is supplied to a seal system of the steam turbine at a predetermined temperature prior to supplying steam to the steam turbine.

6. In a combined cycle power generation system which includes a gas turbine; a steam turbine; and a heat recovery steam generator which includes a superheater section and an evaporator section, and wherein condensate from the steam turbine is reheated in the heat recovery steam generator by exhaust gas from the gas turbine and returned via a main steam outlet to the steam turbine, a method of effecting start-up of the steam turbine comprising the steps of:
   a) dumping a portion of the gas turbine exhaust gas to atmosphere, while simultaneously introducing a remaining portion of the gas turbine exhaust gas to the heat recovery steam generator;
   b) with the main steam outlet from the heat recovery steam generator closed, extracting steam from an intermediate location in the superheater and supplying the extracted steam to the steam turbine at a temperature between about 550–1000° F.; and, after the steam turbine is started and a warm-up cycle completed,
   c) terminating the extraction of steam from the intermediate location in the superheater and opening the main steam outlet from the heat recovery steam generator.

7. The process of claim 6 and including the step of, simultaneously with step c) reducing the portion of the gas turbine exhaust gas dumped to atmosphere to thereby increase the portion of gas turbine exhaust gas introduced into the heat recovery steam generator.

8. The process of claim 6 wherein step a) is carried out with a bypass damper upstream of the heat recovery steam generator.

9. The process of claim 6 wherein condensed steam is supplied to the heat recovery steam generator by a steam turbine condenser and wherein a portion of the steam extracted from the intermediate location in the superheater is supplied directly to the steam turbine condenser.

10. The process of claim 6 wherein condensed steam is supplied to the heat recovery steam generator by a steam turbine condenser and wherein a portion of the steam extracted from the intermediate location in the superheater is supplied to a seal system of the steam turbine at a predetermined temperature prior to supplying steam to the steam turbine.

11. The process of claim 1 wherein steam extracted from the intermediate location of the superheater is at a temperature of about 1000°.

12. In a combined cycle power generation system which includes a gas turbine; a steam turbine; and a heat recovery steam generator which includes a superheater section and an evaporator section, and wherein during normal operation condensate from the steam turbine is reheated in the heat recovery steam generator by exhaust gas from the gas turbine and returned via a main steam outlet to the steam turbine, a method of effecting start-up of the steam turbine comprising the steps of:
   a) introducing the gas turbine exhaust gas to the heat recovery steam generator;
   b) with the main steam outlet from the heat recovery steam generator closed, extracting steam from an intermediate location in the superheater and supplying the extracted steam to the steam turbine at a temperature at or below normal steam inlet temperature; and after start up,
   c) terminating the extraction of steam from the intermediate location in the superheater and opening the main steam outlet from the heat recovery steam generator.

13. The process of claim 12 wherein condensed steam is supplied to the heat recovery steam generator by a steam turbine condenser and wherein a portion of the steam extracted from the intermediate location in the superheater is supplied directly to the steam turbine condenser.

14. The process of claim 12 wherein condensed steam is supplied to the heat recovery steam generator by a steam turbine condenser and wherein a portion of the steam extracted from the intermediate location in the superheater is supplied to a seal system of the steam turbine at a predetermined temperature prior to supplying steam to the steam turbine.

15. The process of claim 12 wherein steam extracted from the intermediate location of the superheater is at a temperature of about 1000° F., and the temperature is thereafter controlled to minimize temperature differential between the extracted steam and metal components of the steam turbine.

* * * * *